United States Patent [19]

Lemelson

[11] 4,342,549
[45] Aug. 3, 1982

[54] APPARATUS FOR CODING ARTICLES

[76] Inventor: Jerome H. Lemelson, 85 Rector St., Metuchen, N.J. 08840

[21] Appl. No.: 110,545

[22] Filed: Jan. 8, 1980

Related U.S. Application Data

[63] Continuation-in-part of Ser. No. 968,216, Dec. 11, 1978, which is a continuation of Ser. No. 667,255, Mar. 16, 1976, abandoned.

[51] Int. Cl.$^3$ .......................... B29C 1/14; B29F 1/022
[52] U.S. Cl. ..................................... 425/150; 65/158; 249/102; 425/162; 425/169; 425/183; 425/185; 425/190; 425/542; 425/324.1; 425/356; 425/468
[58] Field of Search ...................... 264/132, 328.1, 239, 264/284, 349, 219, 299, 40.5, 154, 509; 425/28 R, 162, 163, 416, 460, 468, 472, 182, 183, 190, 192, 193, 195, 185, 28 D, 37, 457, 537, 577, 446, 525, 135, 542, 162, 150, 169, 324.1, 356; 249/102–104, 140, 107, 110, 102; 235/454, 456; 65/158

[56] References Cited

U.S. PATENT DOCUMENTS

| | | | |
|---|---|---|---|
| 2,361,348 | 10/1944 | Dickson et al. | 425/468 |
| 2,485,284 | 10/1949 | Guelph | 425/468 |
| 2,679,663 | 6/1954 | Schwemler | 425/28 |
| 3,060,509 | 10/1962 | McCubbins | 425/468 |
| 3,194,857 | 7/1965 | White | 264/509 |
| 3,210,466 | 10/1965 | Day | 179/100.3 V |
| 3,280,431 | 10/1966 | Fitz | 264/132 |
| 3,434,130 | 3/1969 | Lemelson | 235/480 |
| 3,640,368 | 2/1972 | Weinberger | 400/122 |
| 3,659,974 | 5/1972 | Neugroschl | 425/163 |
| 3,740,759 | 6/1973 | Keegan et al. | 346/134 |
| 3,760,159 | 9/1973 | Davis et al. | 235/454 |
| 3,854,859 | 12/1974 | Sola | 425/376 A |
| 4,004,904 | 1/1977 | Fergusson | 65/158 |

FOREIGN PATENT DOCUMENTS 511239  8/1939  United Kingdom ............... 425/385

Primary Examiner—Willard E. Hoag

[57] ABSTRACT

An apparatus is provided for coding articles of manufacture which are produced in a die or mold, such as by molding, casting or other process in which a moldable material is either flow formed or pressure formed to shape. In one form, a plurality of projectible and retractable pins or shafts are movably supported within at least one section of a mold and are selectively advanced or retracted to either partly extend across the mold or die cavity or extend completely thereacross for producing a coded array of cavities or such an array of holes extending completely through a portion of a wall of an object formed in the mold. Projection and retraction of the pins or shafts is effected by respective powered devices, such as fluidic cylinders, motors or electric solenoids. In another form, a plurality of pins or otherwise shaped devices are selectively actuated or disposed by a manipulator operating from outside the mold while the mold is open, against respective portions of the mold cavity wall. In a third form, an array of pins or an irregular configuration of a strip or plate is positioned at a selected location in the mold and retained therein by fasteners, magnets, adhesive, spot welding or other means to define a portion of the mold cavity in which a molded article is formed to shape and to thereby define the shape of a select portion of the molded article. A plurality of molded articles may be molded of the same code configuration or of configurations defining a progressing code or selected codes wherein such coding is automatically controlled by a computer or programmer controlling the device or devices which vary the shape of the mold cavity.

9 Claims, 5 Drawing Figures

APPARATUS FOR CODING ARTICLES

This application is a continuation-in-part of application Ser. No. 968,216, filed Dec. 11, 1978, which was a continuation of application Ser. No. 667,255 filed Mar. 16, 1976, now abandoned.

SUMMARY OF THE INVENTION

This invention relates to an apparatus and method for coding articles of manufacture, especially produced by molding or casting a moldable material such as plastic resin or metal. In particular, the invention is concerned with a coding apparatus or device disposed in the wall of a mold or movably supported adjacent thereto and operable to vary the shape of molded articles formed by casting, molding or stamping. The shape variation may comprise undulations or cavities molded in a select portion or portions of a wall of an article, variations in edge or corner shape of the molded article or spaced-apart holes formed in a coded array in a select portion of the wall of a molded article by selected of a plurality of pins or fingers which are caused to advance and retract in and through the mold cavity from a wall portion thereof or are selectively disposed in a plurality of retaining locations of the mold wall. In a modified form, a coded bank of movable pins or fingers may be automatically set external of the mold wall on a support and the support and pins thereafter selectively disposed within the mold and retained by a suitable fastening means to define one of the mentioned molding shapes after molding material is disposed and set within the mold. In another form, a strip of plastic or metal, which has been diestamped or otherwise formed with coded holes, cavities, protrusions or a combination of such formations, is automatically inserted into the mold and secured by molding to the molded article during molding for coding and identification purposes. As a result, such mold coding eliminates the need to code form, drill, stamp or otherwise shape the molding after it is removed from the mold in order to code it for identification and routing purposes.

Accordingly, it is a primary object of this invention to provide a new and improved apparatus and method for coding articles of manufacture.

Another object is to provide an apparatus and method for coding articles of manufacture by shaping such articles at the time they are formed.

Another object is to provide an apparatus and method for coding articles of manufacture as they are molded to shape.

Another object is to provide an apparatus and method for coding articles of manufacture as they are cast to shape.

Another object is to provide an apparatus and method for coding articles of manufacture as they are stamped or compression formed to shape in a die or mold.

Another object is to provide an apparatus and method for selectively varying the cavity of a mold in a coded manner.

Another object is to provide an apparatus and method for forming containers by molding wherein a portion of the wall of the container is coded in such a manner that it may be quickly and easily identified by automatic scanning means.

Another object is to provide an improved structure in a mold employed to mold form articles of manufacture with coded variations in the wall portions thereof.

With the above and such other objects in view as may hereinafter more fully appear, the invention consists of the novel combinations and arrangements of parts exemplified by the constructions illustrated in the accompanying drawings, wherein are shown embodiments of the invention but it is to be understood that changes, variations and modifications may be resorted to which fall within the scope of the invention as claimed.

Figure 3:
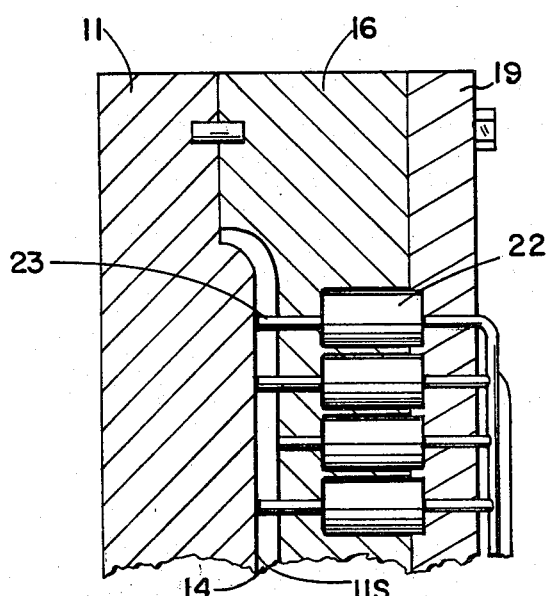
FIG. 3 is a view similar to FIG. 1 wherein the shafts or pins which are partially projected in FIG. 2 are completely projected through the mold cavity to provide respective holes in the wall of the molded article, which holes are disposed in a coded array.
Figure 4:
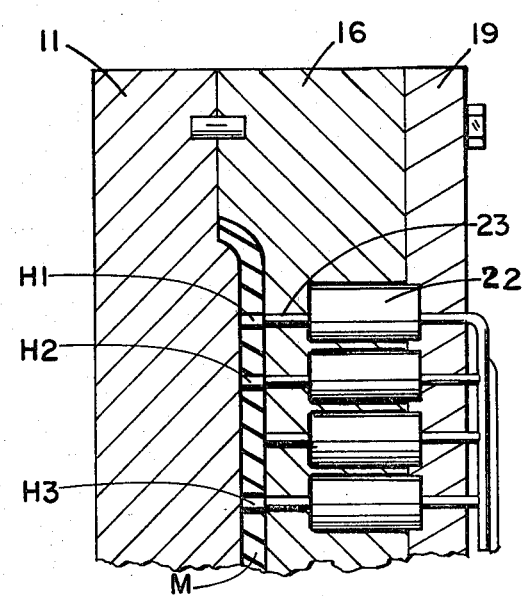
Figure 5:
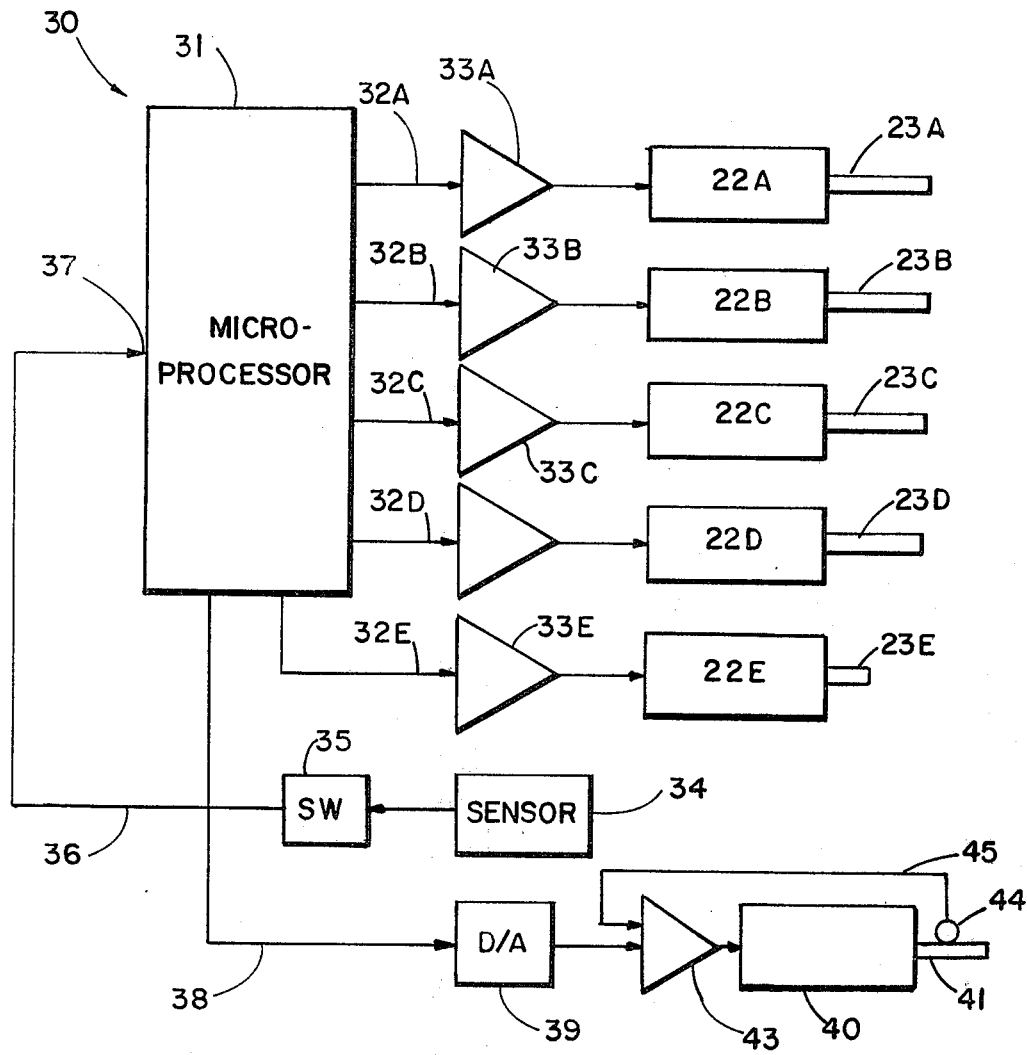

FIG. 4 is a view similar to FIG. 3 showing the shafts or pins fully retracted from the molding leaving three holes formed in the molding, and FIG. 5 is a schematic of an electronic control system for controlling operation of solenoids or motors for projecting and retracting shafts or pins with respect to a mold cavity to provide cavities or holes through the wall of an article formed in a mold or die wherein such cavities or holes may vary in number and locations from one piece to another or a plurality of such pieces.

Figure 1:
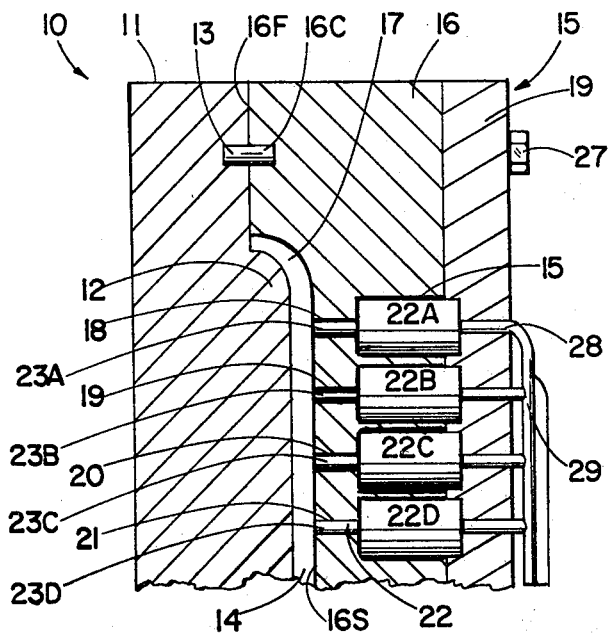
FIG. 1 is a sectioned view of a portion of a multiple part mold, such as a plastic injection mold or a die-casting mold, in which an article may be molded to shape in a cavity thereof wherein one of the mold sections contains a plurality of devices for projecting and retracting pins or shafts into the mold cavity in a coded array.
Figure 2:
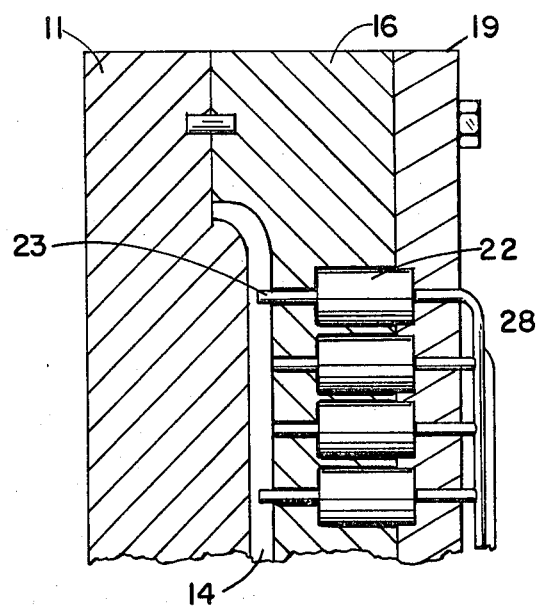
FIG. 2 shows the mold of FIG. 1 in which two of the shafts or pins are partially projected into the mold cavity to provide respective cavities in an article molded therein, which cavities are spaced and of such a number to define a code.

In FIGS. 1–2 is shown a coding arrangement for coding articles of manufacture, such as molded containers, identification tags, or otherwise shaped articles by varying the shape of a select portion of a wall of the article. A mold assembly 10 is provided which is formed of two mold sections 11 and 16 for forming articles by processes such as metal casting, plastic resin molding or compression molding within a cavity 14 which is formed when the two sections are properly assembled for such casting or molding process. Mold section 11 has a protruding portion 12 and section 16 a cavity portion 17, both defining the molding cavity 14 therebetween. A plurality of alignment pins 13 are supported by mold section 11, one of which is shown, and slidably fits into respective cavities 16C formed in the abutting face 16F of the mold section 16. An inlet (not shown) is provided, either between the mold sections or through one of the mold sections, for flowing a suitable molding material to the mold cavity 14 in a manner to completely fill such cavity for forming a molding therein when such material sets or solidifies, such as upon cooling therein. Other features which are not shown, may include passageways or ducts extending through either or both the mold sections for flowing suitable heat transfer fluid therethrough for cooling or heating such mold sections to either more rapidly solidify molten molding material in the cavity or set a thermosetting resin therein depending upon the molding process which is employed. Conventional and known means may also be provided for injecting molding material into the cavity 14, closing and separating the mold sections and removing the molding therefrom.

Formed within the main wall section 16 of the mold 10 adjacent cavity 14 are a plurality of closely spaced holes 18-21, each of which contains a respective pin or shaft 23 of a lineal actuator 22, the respective shafts being denoted 23A-23D and the actuators 22A-22D. The latter actuators are respectively supported within larger cavities 15 formed in the mold section 16 and are held therein by means of a back plate 19 which abuts the rear face of the mold section 16 and is secured thereto by means of a plurality of fasteners 27. Extending through respective holes in the back plate 19 are respective lines 28 for controlling the operation of the lineal actuators 22. If the actuators 22 are fluidic actuators, the lines 28 may each contain a pair of hydraulic or pneumatic lines extending from a remote hydraulic or pneumatic control for controlling the actuators to project their shafts 23 into the mold cavity 14 or retract to the locations illustrated in FIG. 1 whereby each pin or shaft 20 has its free end flush with the surface 16S of the mold cavity wall defined by the mold section 16. A suitable metal dynamic seal or O-ring seal may be provided in circular grooves formed in the holes 18-21 about the shafts 23 to prevent molding material from flowing into the spacing between the shafts and the holes during molding or the sliding fit between such shafts and the holes in which they are supported may be such as to prevent such flow of molding material.

If the actuators 22 are electrical in operation, such as solenoids, the lines 28 may each contain a wire pair connected to a respective automatically or manually controlled switch for activating such solenoids to project or retract their shafts with respect to the volume defined by the mold cavity 14. The actuators or solenoids are therefor preferably of the bi-stable type permitting the projected shaft of each to remain in a projected position within or across the mold cavity 14 during the molding operation or may be so projected during or after molding.

In FIG. 2, two of the shafts 24A and 24D of the lineal actuators 22A and 22D are shown partially projected into the mold cavity 14 while the shafts of the other actuators 22B and 22C are retracted so that their ends are flush with the surface 16S of the mold cavity wall. In the arrangement illustrated in FIG. 2, two cavities of predetermined shape and spacing will be provided in the select portion of the molding adjacent the holes 18 and 21 and their spacing and number may be utilized to define a coded array of cavities in the molded article which may be automatically sensed by such devices as limit switches, photoelectric detectors, fluidic stream sensors or other means as the article is inspected or moves past a sensing station on a conveyor.

In FIG. 3, the shafts 23A,23B and 23D are shown fully projected across the mold cavity 14 so that they forcibly abut the surface 11S of the mold cavity formed by the mold wall section 11 and thereby form respective holes extending completely through the wall of the molding formed in the cavity 14. The pins or shafts 23A,B and D may remain projected after the molding is set within the mold cavity 14 and during the procedure in which the molding is removed from the cavity by pulling or otherwise ejecting it from the mold section against which it is disposed after the mold is open or may be retracted by a suitable remote controller or computer controlling the operation of the respective lineal actuators 22A to 22D prior to removal of the molding from the mold and after the molding material has set to a predetermined shape.

While but four lineal actuators are illustrated in FIGS. 1-3, depending on the nature and extent of the code utilized to code form the articles molded in the mold 10, one or more additional actuators extending either laterally or longitudinally adjacent those illustrated in the drawings, may also be provided in respective cavities of the mold section 16 and/or the mold section 11 and may be selectively controlled to project and retract their respective shafts with respect to the molding cavity to provide either a coded array of cavities across a select portion of the surface of the molded article or a coded array of holes through a select portion of a wall of the molded article depending on the type of coding desired.

The coding apparatus shown in the drawings may also be utilized, as shown or in a modified form thereof, to provide edge coding along an edge of a wall or corner portion of an article formed to shape in a mold of the type illustrated or a modified form thereof. In other words, if the drawings illustrate portions of the mold sections and cavity therebetween which define an edge of a wall of a container or other article, then selective projection and retraction of the solenoids or fluidic actuators may be utilized to close off and retain portions of an edge or corner of the article molded in the cavity to permit same to be scanned with a limit switch or switches, photoelectric detector or detectors, or other suitable scanning means which is prepositioned with respect to the molded article or has the article prepositioned on a conveyor or circuit with respect thereto.

In FIG. 4 the shafts 23 of the actuators 22 which were projected against the wall of the cavity of the opposite mold section (e.g. 23A,23B and 23D of FIG. 3) are shown fully retracted with respect to their actuators after the molding M has set in the cavity 14 leaving holes $H_1$, $H_2$ and $H_3$ formed in and extending completely through the wall of the molding wherein such holes define a coded array of holes which may define a parallel code to be read by a bank of photoelectric cells detecting light passing therethrough or a series code if read by a single photoelectric cell when the movement of the molding M or the assembly of which it is a part is moved in a direction which is parallel to the line of such holes. It is noted that the holes so formed may be cylindrially shaped or oblong in shape to define a bar-type code, as may cavities molded in the molding wall by the technique illustrated in FIGS. 1 and 2.

As noted, the pins or shafts 23 of the actuators 22 may be projected into the mold cavity in a coded array thereof prior to the injection of molding cavity or immediately after molding resin is so injected but preferably before it has set so as to permit proper penetration thereof by the shafts to form the cavities or holes in the molding. If the molding material in the mold cavity 14 is a sheet molding compound of one or more resins, it is preferably heat softened when the shafts 23 are projected to permit easy penetration. However, if the sheet or molding is in a hard or set condition and is die formed to shape in the cavity 14 holes in a coded array may be punched therethrough if the actuators 22 are of sufficient power to do so.

FIG. 5 shows an automatic control system 30 for properly controlling operation of five actuators 22A-22E of the type described for selectively projecting or retracting their respective shafts 23A-23E in different coded arrays for each molding formed in the mold cavity for for each predetermined number of such moldings as defined by signals generated from a memory of a computer or microprocessor 31. The memory of the microprocessor 31 may be so constructed as to generate on its outputs 32A to 32E signals in coded arrays defining an arithmetic or progressive binary code representing any desires series of numbers depending on the number of molded pieces to be so coded. For example, if there are one hundred pieces to be molded and coded, then the coded electrical signals generated on the paralle outputs 32A-32E of microprocessor 31 may number in binary code form from 1 to 100 if each molding is desired to have a different code for identifying it. The same code may also include holes or cavities defining such information as destination, date, ownwrship, routing, or other information needed to be determined by scanning the molding as it passes, for example, along a conveyor past a bank or photoelectric cells fixedly supported at the side of the conveyor. Each of the outputs 32A-32E extends to a driver or amplifier 33A-33E for providing suitable power, when so activated, for power driving the respective solenoids or servo motors 22A-22E.

If the code so formed is to change from one molding formed in the mold to another, a sensor 34 such as a limit switch is provided for sensing mold movement, as in opening, which sensor provides a feedback signal on its output 36 to an input 37 to the computer or microprocessor 31 which signal is used to step the switching circuits thereof to generate the next code in the particular progression of such codes on the outputs 32A-32E for properly operating the actuators or solenoids 23A-23E. A manual or remote controlled switch 35 is provided in the limit switch output 36 if it is desired to retain a particular coded array of projected shafts for providing the same code formed in a plurality of moldings. However, such switch may be eliminated by properly programming the microprocessor to generate the same code on its outputs 32 for the desired number of times or until a counter uncounts. If the microprocessor 31 is of the programmable (PROM) type, inputs thereto from a keyboard, card or tape reader may preset or program its memory to generate any desired code or series of codes on its parallel outputs 32A-32E with each molding cycle.

Also shown in FIG. 5 is a control subsystem for controlling the operation of a motor 40 powering a pump or extrusion screw for forcing molding material into the mold cavity during each molding cycle. Pulse signals generated on an output 38 of the microprocessor or digital computer 31 define the amount of molding material to be injected, and are generated as a pulse train when the mold is fully closed and the actuators 22 have been properly controlled as described. Such pulse signals are converted to an analog command signal by a digital-to-analog converter 39 the output of which extends to a summing amplifier 43, the other input to which extends from a variable tachometer 44 driven by the shaft of the controlled motor 40. A difference signal is generated on the output of the summing amplifier 43 which is applied to operate the motor 40 at a suitable time and rate to properly provide molding material in the cavity of the mold in a molding cycle which includes the selected operation of the actuators or motors 22A-22E.

The retracted positions of the shafts 22A-22E, such as shown for shaft 22E, are preferably such that the ends of such retracted shafts are flush with the surface of the mold cavity wall from which they protrude when projected to form cavities or holes through the molding. When so retracted, they are preferably incapable of further retracting into the cavities 18-21 in which they longitudinally move so as to prevent molding material from forming protrusions in the molding. When extended, as described to form holes or cavities, such shafts are preferably locked in place. If forced flush against the opposite wall of the mold cavity or subcavities therein, such shafts preferably have their ends sealed thereagainst to prevent molding material from forming between such shafts and the mold wall.

The control system 30 of FIG. 5 may also be employed to project and set pins in coded arrays in subcavities in the mold wall by employing respective actuator driven devices for engaging and releasing the pins in the mold cavity positions defined by such retaining subcavities to code form the molding as described and illustrated in FIGS. 3 and 4. Such an apparatus will include a manipulator for a head containing the coded array of such pins or holders for such pins which seize and release the pins with respect to the mold cavity wall.

The molding so formed, may be any suitable solid or hollow shape and may be formed by injection molding, blow molding, rotational molding, casting, sheet molding hot or cold forming, compression molding or other means using any suitable formable molding material such as resin, metal, ceramic, etc.

The microprocessor 31 or a digital computer performing the function of properly projecting and retracting the coding pins or shafts may also perform all the control functions necessary to effect proper molding. Although not shown, it is assumed that the necessary power supplies are provided to electrically operate each of the components illustrated and described.

Modifications to the invention illustrated in FIGS. 1-5 are noted as follows:

(1) Code producing actuators of the type illustrated may be provided exterior of the mold cavity 14 and located so as to selectively project their shafts into the mold cavity just prior to the operation of casting, injecting or otherwise compressing a molding material into the mold cavity.

(2) Actuators of the type described, may be supported on a manipulator which may be automatically moved to one of the mold sections when the mold is opened and employed to apply their shafts or portions thereof to a selected portion of the mold cavity wall for retaining same therein during the molding procedure wherein such shaft portions may become part of the molding or may provide cavities or holes through the molding during molding as described for coding purposes.

(3) A coded strip of metal or plastic may be formed by selective stamping or other means and may be inserted into the mold cavity and disposed against a select portion of the wall thereof to either become part of the molding or provide an irregular shape for a portion of the surface of the molding which shape defines the desired scannable code. Such strip or section of coded shape may be embedded within a portion of the mold wall and hidden from view to be sensed by a suitable sensor disposed along or at the side of a conveyor along which the molding is carried for sensing and generating electrical signals defining the code thereof, or may form an exposed and visible part of the molding wall to be photoelectrically detected or detected by other sensing means to generate the code signals identifying the article or container formed of the molding as the molding or container is carried along the conveyor or is otherwise positioned with respect to the scanning means or sensor(s).

In the embodiment of the invention employing coding pins or coded bars or strips disposed by a manipulator within the mold cavity during the molding operation, such devices may be predeterminately held in place against the wall of the mold cavity by magnetic attraction, electrostatic force, welding, fasteners or frictional fitting thereof in respective cavities. Where a row of closely spaced cavities are provided for receiving, prepositioning and retaining such pins or coded member, those cavities which are opposite the portions of the molding formed in the mold which do not have cavities or holes formed in the molding may be filled with short pins which lie flush with the surface of the mold cavity wall while the adjacent cavities contain pins which protrude outwardly from the mold wall for forming such holes or cavities in the molding. Selected of such pins may be removed and replaced by the manipulator to define new coded arrays thereof by means of magnetic attraction or force applied to knock them out of the cavities.

(4) In yet another embodiment, moldings may be coded in the mold in which they are formed by selectively depositing coding material in the configuration of particles forming bars, spots or other shapes against a select portion of the mold cavity wall and held thereagainst by adhesion, magnetic or electro-static force during the molding procedure to cause such deposited material to become secured to the molding in such coded arrays and to be removed therewith when the molding is removed from the mold. Details of one form of depositing particles against the surface of a mold are shown in my U.S. Pat. No. 3,504,063 which may be modified and controlled by a computer or microprocessor of the type described to provide coded arrays of spots or bars of such particulate material against the surface of the mold cavity wall. For example, signals generated from such a memory or controller may be employed to selectively vary the openings in a mask by selectively operating a plurality of servos or solenoids to effect such variations in a progressing series of coded arrays which change from one molding cycle to the next. Such signals may also be applied to deflection control an ink jet printer which is projected into the mold cavity or near the wall of the mold cavity by a manipulator when the mold is open and operates to apply such coding material to selected spot, band or bar-like areas of the mold wall prior to molding for transfer to the wall of the molding as described in U.S. Pat. No. 3,504,063.

I claim:

1. Molding apparatus comprising in combination:
   a first mold section,
   a second mold section,
   means for abutting said first and second mold sections to define a molding cavity therebetween,
   a variable shaping means secured to one of said mold sections and protruding therefrom into the mold cavity formed between said mold sections,
   said variable shaping means defined by a plurality of movable mold members variably positionable with respect to said one mold section to permit said mold members to be disposed in a coded array on said one mold section wherein selected of said members protrude into said mold cavity, said mold cavity being configured to permit a moldable material disposed in said mold cavity to set and form an article of predetermined shape and said variable shaping means being operable to provide a plurality of cavities in a wall of said molded article, which cavities and their spacing define a code which is detectable by means disposed adjacent the molded article for sensing said cavities and actuating means to selectively protrude said movable mold members into said mold cavity.

2. Apparatus in accordance with claim 1 wherein said variable shaping means comprises a plurality of protruding pins, which pins extend completely across said cavity formed between said mold sections, and the axes of said pins extend parallel to each other and parallel to the direction in which said mold sections are brought together and separated from each other so as to permit an article molded in said mold cavity to be removed therefrom and from said pins.

3. A molding apparatus in accordance with claim 2 wherein said pins protrude through the mold cavity and abut the opposite wall of the mold cavity when the mold is closed so as to form holes in the molding formed within the mold cavity when molding material is formed to shape therein about said pins.

4. A molding apparatus in accordance with claim 2 including controllable power operated means for controllably varying the locations of said pins in said mold cavity so as to define different coded arrays of said pins for forming different arrays of coded cavities in different moldings formed in said mold cavity.

5. A molding apparatus in accordance with claim 4 wherein said means varying the locations of said pins in said mold cavity includes a plurality of motor means each power operable to drive and locate a respective pin in the mold cavity, and means for selectively operating each of said motor means to cause it to move a respective pin whereby said pin will be disposed within the mold cavity when the mold sections are operatively assembled for molding.

6. Molding apparatus in accordance with claim 5 wherein said plurality of motor means are supported by one of said mold sections.

7. Molding apparatus in accordance with claim 5 whereby said means for selectively operating said motor means comprises respective controls for each motor means and master control means connected to each of said controls for respectively controlling each motor means in a manner to dispose selected of said pins in different coded arrays within said mold cavity during different molding cycles to define different coded shapes for the moldings formed during said different molding cycles.

8. Molding apparatus in accordance with claim 7 wherein said master control means includes means for controlling said controls for said motor means to cause said motor means to provide said pins in said mold cavity in coded arrays thereof which vary from one molding cycle to the next in a numerically progressing order.

9. Molding apparatus in accordance with claim 7 including means for generating a cycle control signal during each cycle of molding and means for applying said control signal to activate said master control means to control said motor means to dispose selected of said pins in the mold cavity during each molding operation, to define differently coded moldings from each cycle.

* * * * *